Sept. 27, 1949.  R. E. HANKE  2,483,092
CANVAS CUTTER AND BUTT JOINER
Filed Sept. 8, 1948  2 Sheets-Sheet 2
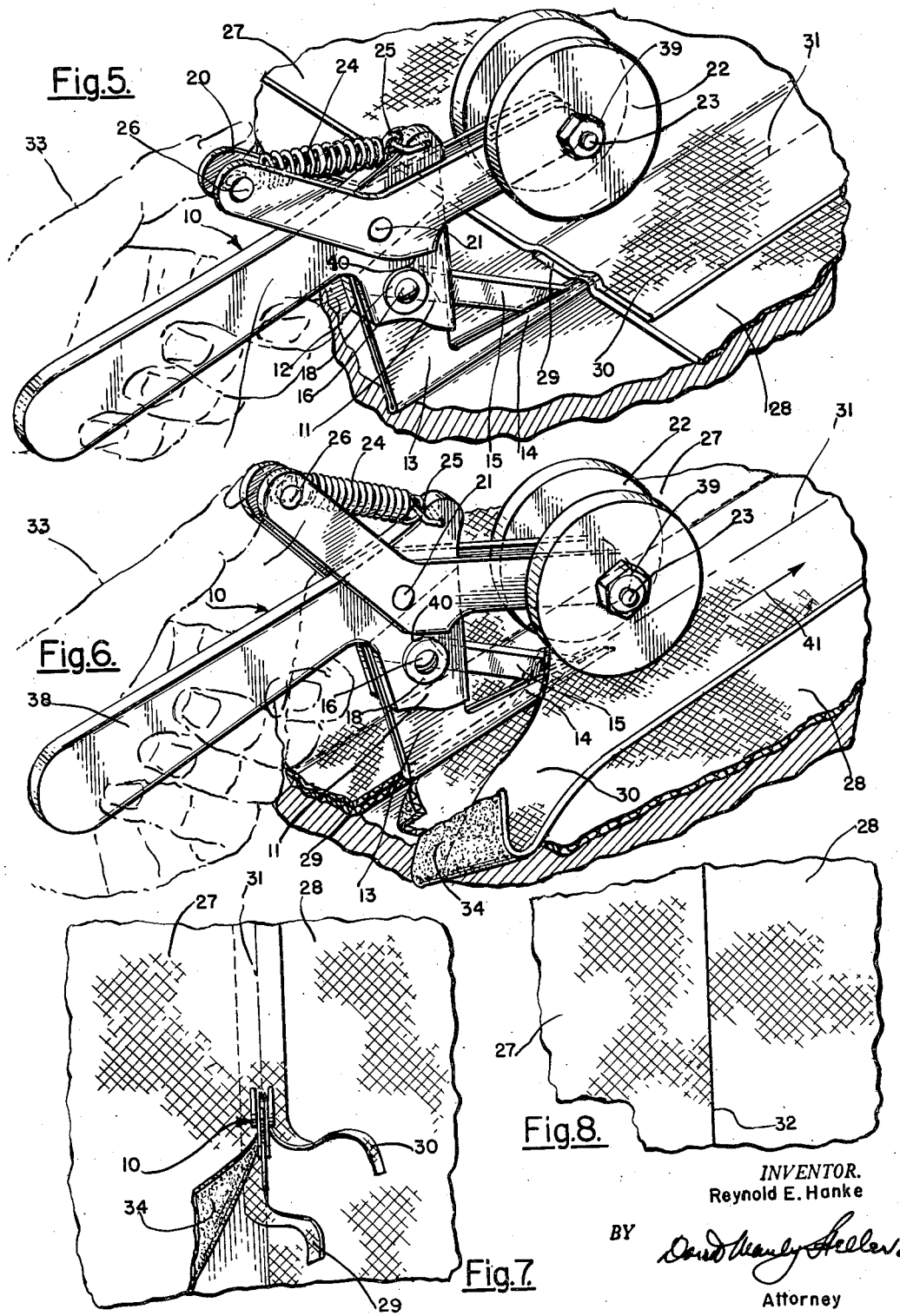
INVENTOR.
Reynold E. Hanke
BY
Attorney Patented Sept. 27, 1949

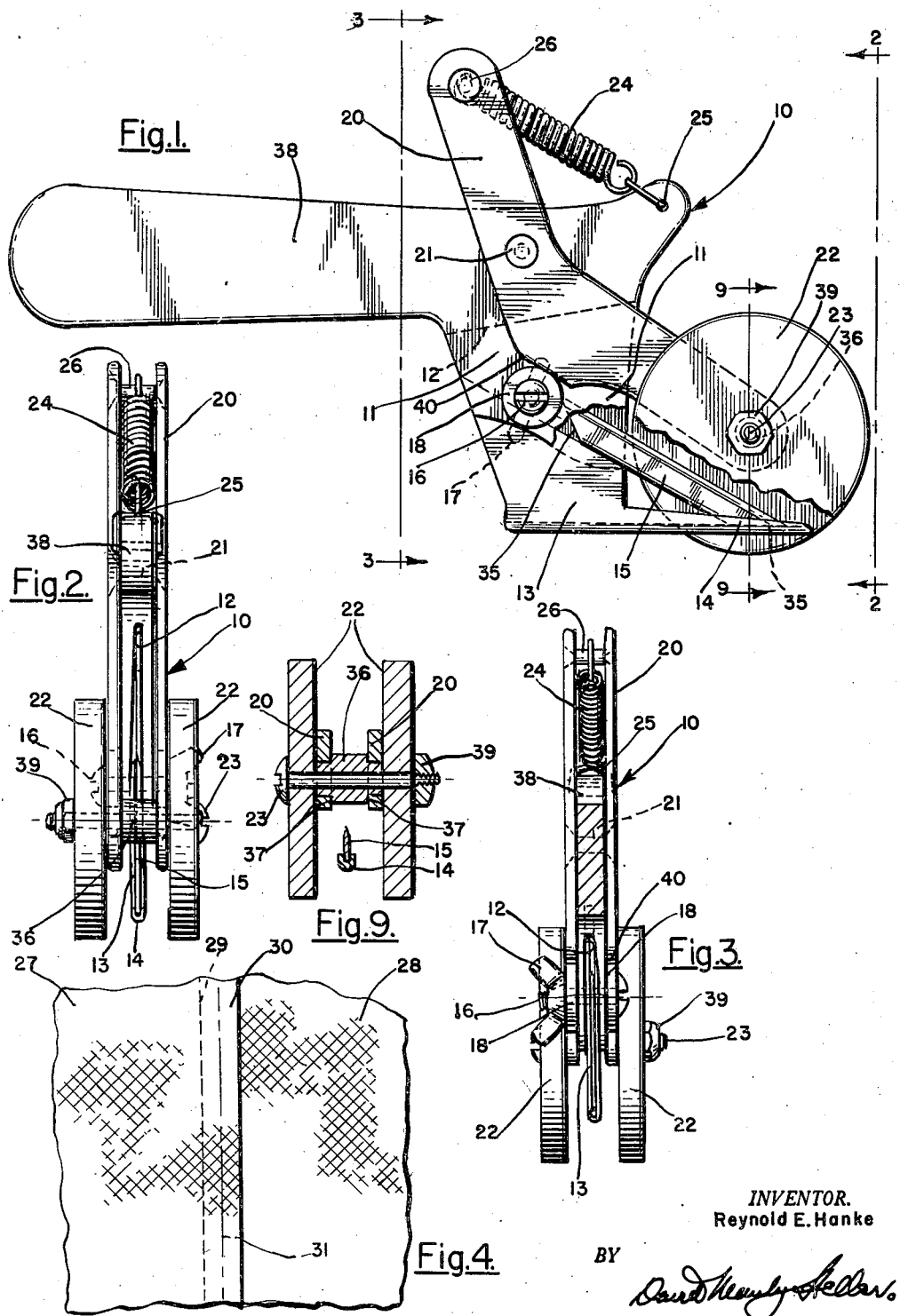

2,483,092

UNITED STATES PATENT OFFICE 2,483,092

CANVAS CUTTER AND BUTT JOINER

Reynold E. Hanke, Chicago, Ill.

Application September 8, 1948, Serial No. 48,289

6 Claims. (Cl. 30—294)

My invention relates to canvas cutter and butt joiner devices.

In applying decorator's canvas to walls it is common practice to overlap the ends of joining pieces of canvas and by using a knife or razor blade, a cut is made down the center of the overlap or selvage canvas portions to provide a butt joint for the said canvases. It is a difficult operation to guide a cutting knife in a straight line and at the same time apply the proper pressure thereto for cutting two thicknesses of canvas without damaging the wall beneath. Therefore, I have devised a canvas cutter and butt joiner, the handling of which requires very little skill to cut a straight butt joint, and the design of which prevents any damage to the wall beneath the canvas.

An important object of my invention is to provide a canvas cutter and butt joining device of the above mentioned character, having a pointed guide shoe which is inserted beneath the canvas selvage portions, and which supports a cutting knife with the cutting edge uppermost, thus preventing damage to the wall and dulling of the knife blade by contact with the wall.

A further object of my invention is to provide canvas holding rollers pivotably mounted on the canvas cutter and butt joining device for the purpose of holding the overlap edges tautly against the cutting edge of the knife during the cutting operation.

A still further object of my invention is to provide a canvas cutter and butt joining device having the means for removing and reversing, as well as replacing, the cutting knife when the cutting edge becomes dull through use.

A further object of my invention is to provide a canvas cutting and butt joining device having tension spring means for holding the canvas rollers in a firm and close contact with the canvas selvages during the cutting operation.

A still further object of my invention is to provide a canvas cutting and butt joining device that is simply designed and may be economically manufactured in large quantities.

Other objects and advantages embraced in my invention will be disclosed in the following description and the accompanying illustration, in which like parts are designated by like numerals, and in which:

Fig. 1 is a side view of my invention with parts cut away to show the mounting of the cutting knife means thereof.

Fig. 2 is an end view of my invention, taken looking in the direction of lines 2—2 on Fig. 1.

Fig. 3 is an end view of my invention, partly in cross-section, taken looking in the direction of lines 3—3 on Fig. 1.

Fig. 4 is a fragmentary view of a wall upon which two joining pieces of decorator's canvas have been applied with their edges overlapping.

Fig. 5 is an enlarged perspective view of my invention shown being started at the cutting line of the selvage portions of two pieces of decorator's canvas applied to a wall.

Fig. 6 is an enlarged perspective view of my invention shown in operation cutting and butt joining the decorator's canvas.

Fig. 7 is a fragmentary view of a wall with two joining pieces of decorator's canvas thereon being cut and butt jointed by my invention and showing the selvage edges of canvas being removed therefrom.

Fig. 8 is a fragmentary view of a wall on which two pieces of decorator's canvas have been butt jointed, and showing the straight and even butt joints between the two pieces of decorator's canvas.

Referring to the illustrations, my invention is generally designated 10, and consists of a handle means 38, having a knife and guide shoe holding portion 11, in which a guide shoe retaining slot 12 has been formed. The said handle means 38 may preferably be made of plastic. A guide shoe element 13 is frictionally mounted within the said guide shoe retaining slot 12, as shown in Figs. 1, 2 and 3. The said guide shoe element 13 is provided with a pointed toe portion 14 and is preferably formed of sheet metal bent and folded together to allow a cutting knife, designated 15, to be frictionally held between the said toe portion 14 and the knife and guide shoe holding portion 11 of handle means 38. A knife retaining screw 16, together with washers 18 and wing nut 17, hold the said guide shoe element 13 and cutting knife 15 firmly in place within the slot 12 through a hold 19 in guide shoe element 13 and guide shoe holding portion 11. Loosening wing nut 17 permits the removal and replacing of knife blade 15. A bifurcated roller support 20 is pivoted at 21 on handle means 38, as shown in Fig. 1. Canvas rollers 22 are mounted on the outside of the bifurcated portion 20, and held rotatably in place by a shoulder screw 23 and a tubular spacer 36. The said tubular spacer 36 is provided with a shoulder 37, as shown in Fig. 9, to maintain the bifurcations 20 and the canvas rollers 22 firmly, but non-frictionally in place. A lock nut 39 holds the said shoulder screw 23 tightly in place while allowing the rollers 22 to rotate freely. A tension spring 24 is anchored at 25 on one end of handle means 38. The other end of tension spring 24 is secured by shoulder rivet 26 to the free ends of bifurcated roller support 20 to maintain the said bifurcated roller support 20 together with canvas rollers 22 in a normally downward position, as shown in Figs. 1, 2, 3 and 6. Stop portions 40 are formed on the lower edges of bifurcations 29 to contact washers 18 in preventing the tubular spacer 36 from touching the cutting edge of knife 15.

It is general practice in applying decorator's canvas to walls to coat one side of the said decorator's canvas with an adhesive, designated 34. Where two lengths of decorator's canvas, designated 27 and 28, are to be joined, it is common practice to overlap the edges thereof. The said overlaps are generally called selvages, and are designated 29 and 30, and shown in Fig. 4. The cutting line, designated 31, is drawn parallel with the edges of selvages 29 and 30 and midway therebetween.

Fig. 5 illustrates the starting of the cutting operation, wherein the point of toe portion 14 is inserted beneath the two thicknesses of selvage 29 and 30 and in line with the cutting line 31. The bifurcated roller support 20 with the rollers 22 are held in a raised position by the thumb of the hand, designated 33, and shown in phantom lines.

Fig. 6 shows the cutting operation of my canvas cutter and butt joining device wherein the said canvas cutter and butt joining device 10 is pushed forward in the direction of arrow 41 in Fig. 6, causing the canvas selvage portions 29 and 30 to be held tautly against the edge of knife blade 15 by rollers 22 making a clean straight cut. At the end of the cutting operation, the severed selvages 29 and 30 are removed from the wall by lifting the edge of canvas length 27, as shown in Fig. 7. The said canvas 27 is replaced leaving straight and even butt joint 32, a result so necessary in the application of decorator's canvas to walls.

A most important feature of my invention is the impossibility of damaging either the wall or the blade of the cutting knife due to the design and position of the knife within the guide shoe. The said cutting knife 15 may be bevelled at both ends, designated 35 and shown in Fig. 1, so that the knife may be removed and reversed when the cutting portion becomes dull through use.

Although my invention has been described, the terms used are to be deemed terms of description rather than terms of limitation, my intention being to retain the right to all mechanical equivalents of the structural elements depicted, provided they fall within the purview of the appended claims.

Having thus disclosed and revealed my invention, what I claim as new and desire to secure by Letters Patent is:

1. Canvas cutter and butt jointing means comprising, handle means terminating in a downwardly depending slotted guide shoe holding portion, guide shoe means having one end thereof secured in the said slotted guide shoe holding portion and terminating in a channelled toe portion, knife blade means secured in angular relationship in the said slotted guide shoe holding portion and the said channelled toe portion, bifurcated roller support means pivotably secured to the said handle means, guide rollers rotatably secured to the lower terminus of said bifurcated roller support means astraddle the said knife blade means, spring means interconnecting the said handle means and the free end of the said bifurcated roller support means adapted to hold said guide rollers in a firm and close contact with the work, screw and wing nut means securing the said guide shoe means and one end of the said knife blade means, and washer means secured adjacent the head of said screw and wing nut means, the said bifurcated roller support means being provided with a stop portion to limit the downward movement thereof.

2. Canvas cutter and butt jointing means comprising, handle means terminating in a downwardly depending slotted guide shoe holding portion, guide shoe means having one end thereof secured in the said slotted guide shoe holding portion and terminating in a channelled toe portion, knife blade means secured in angular relationship in the said slotted guide shoe holding portion and the said channelled toe portion, bifurcated roller support means pivotably secured to the said handle means, guide rollers rotatably secured to the lower terminus of said bifurcated roller support means astraddle the said knife blade means, spring means interconnecting the said handle means and the free end of the said bifurcated roller support means adapted to hold said guide rollers in a firm and close contact with the work, tubular spacer means connecting the said lower terminus of the said bifurcated roller support means, screw and nut means passing through the said tubular spacer means and the said guide rollers securing the said rollers in rotatable relationship, screw and wing nut means securing the said guide shoe means and one end of the said knife blade means, and washer means secured adjacent the head of said screw and wing nut means, the said bifurcated roller support means being provided with a stop portion to limit the downward movement thereof.

3. Canvas cutter and butt jointing means comprising, handle means terminating in a downwardly depending slotted guide shoe holding portion, guide shoe means having one end thereof secured in the said slotted guide shoe holding portion and terminating in a channelled toe portion, knife blade means secured in angular relationship in the said slotted guide shoe holding portion and the said channelled toe portion, bifurcated roller support means pivotably secured to the said handle means, guide rollers rotatably secured to the lower terminus of said bifurcated roller support means astraddle the said knife blade means, and spring means interconnecting the said handle means and the free end of the said bifurcated roller support means adapted to hold said guide rollers in a firm and close contact with the work, the said knife blade means being provided with bevelled ends to permit reversal thereof.

4. Canvas cutter and butt jointing means comprising, handle means terminating in a downwardly depending slotted guide shoe holding portion, guide shoe means having one end thereof secured in the said slotted guide shoe holding portion and terminating in a channelled toe portion, knife blade means secured in angular relationship in the said slotted guide shoe holding portion and the said channelled toe portion, bifurcated roller support means pivotably secured to the said handle means, guide rollers rotatably secured to the lower terminus of said bifurcated roller support means astraddle the said knife blade means, spring means interconnecting the said handle means and the free end of the said bifurcated roller support means adapted to hold said guide rollers in a firm and close contact with the work, tubular spacer means connecting the said lower terminus of the said bifurcated roller support means, and screw and nut means passing through the said tubular spacer means and the said guide rollers securing the said rollers in rotatable relationship, the said knife blade means being provided with bevelled ends to permit reversal thereof.

5. Canvas cutter and butt jointing means comprising, handle means terminating in a downwardly depending slotted guide shoe holding portion, guide shoe means having one end thereof secured in the said slotted guide shoe holding portion and terminating in a channelled toe portion, knife blade means secured in angular relationship in the said slotted guide shoe holding portion and the said channelled toe portion, bifurcated roller support means pivotably secured to the said handle means, guide rollers rotatably secured to the lower terminus of said bifurcated roller support means astraddle the said knife blade means, spring means interconnecting the said handle means and the free end of the said bifurcated roller support means adapted to hold said guide rollers in a firm and close contact with the work, and screw and wing nut means securing the said guide shoe means and one end of the said knife blade means, the said knife blade means being provided with bevelled ends to permit reversal thereof.

6. Canvas cutter and butt jointing means comprising, handle means terminating in a downwardly depending slotted guide shoe holding portion, guide shoe means having one end thereof secured in the said slotted guide shoe holding portion and terminating in a channelled toe portion, knife blade means secured in angular relationship in the said slotted guide shoe holding portion and the said channelled toe portion, bifurcated roller support means pivotably secured to the said handle means, guide rollers rotatably secured to the lower terminus of said bifurcated roller support means astraddle the said knife blade means, spring means interconnecting the said handle means and the free end of the said bifurcated roller support means adapted to hold said guide rollers in a firm and close contact with the work, tubular spacer means connecting the said lower terminus of the said bifurcated roller support means, screw and nut means passing through the said tubular spacer means and the said guide rollers securing the said rollers in rotatable relationship, and screw and wing nut means securing the said guide shoe means and one end of the said knife blade means, the said knife blade means being provided with bevelled ends to permit reversal thereof.

REYNOLD E. HANKE.

REFERENCES CITED

The following references are of record in the file of this patent:

UNITED STATES PATENTS

| Number | Name | Date |
|---|---|---|
| 625,550 | Geisendorff et al. | May 23, 1899 |
| 944,019 | Conrow | Dec. 21, 1909 |
| 1,493,484 | Enholdt | May 13, 1924 |
| 2,294,018 | Borst | Aug. 25, 1942 |